United States Patent [19]

Hammond et al.

[11] Patent Number: 4,920,536
[45] Date of Patent: Apr. 24, 1990

[54] ERROR RECOVERY SCHEME FOR DESTAGING CACHE DATA IN A MULTI-MEMORY SYSTEM

[75] Inventors: Gary N. Hammond; Michael D. Taylor; Nongnuch Taylor, all of San Jose, Calif.

[73] Assignee: Amdahl Corporation, Sunnyvale, Calif.

[21] Appl. No.: 258,202

[22] Filed: Oct. 14, 1988

[51] Int. Cl.⁵ .................. G06F 11/10; G06F 11/16
[52] U.S. Cl. ............................. 371/10.1; 364/200; 371/51.1
[58] Field of Search ... 364/200 MS File, 900 MS File; 371/10.1, 49.1, 51.1

[56] References Cited

U.S. PATENT DOCUMENTS 4,525,777 6/1985 Webster et al. .................. 364/200
4,654,819 3/1987 Stiffler et al. .................... 364/900

Primary Examiner—Charles E. Atkinson
Attorney, Agent, or Firm—Fliesler, Dubb, Meyer & Lovejoy

[57] ABSTRACT

In a data processing system in which a processor has a cache receiving data staged from at least two main memories. Performance is enhanced by providing an indicator identifying the main memory from which data is staged. When data in the cache is destaged, the indicator is used to direct the destaged data to the proper main memory. If an error occur in the indicator, the data will be destaged to each main memory where a check is made on the address of the data to determine whether the main memory is the source of the destaged data. The data is stored in a main memory only if the memory is the source thereof.

16 Claims, 4 Drawing Sheets

ERROR RECOVERY SCHEME FOR DESTAGING CACHE DATA IN A MULTI-MEMORY SYSTEM

FIELD OF THE INVENTION

The present invention relates to a cache memory system where the cache memory is connected to at least two main memory facilities. The cache memory system of the present invention can advantageously be used in a multiprocessor system in which each processor has access to both its own local memory facility and the main memory facilities of other processors. Specifically, the present invention relates to the destaging of data in a multi-memory system and more specifically to a recovery scheme for errors in identifying the source main memory facilities of the cache data.

BACKGROUND OF THE INVENTION

In data processing systems with sizable main memory capacity, cache memory is usually employed to achieve an optimum ratio of memory cost versus data access speed. In cache memory systems, data in the main memory is "staged" into a cache memory where it is accessed by the central processing unit. Because the speed of the cache memory is higher than that of the main memory, the time spent by the central processing unit in data access will be reduced. However, because of the higher cost of the cache memory, the storage space provided by the cache memory is usually a small subset of the memory space of the main memory. When the storage space in the cache memory is exhausted, data in a portion of the cache memory will be "destaged" back to the main memory to make room for new data.

In many modern large scale data processing systems such as the AMDAHL System/5890, individual systems can be coupled together into a multiprocessor configuration to improve system processing capability and reliability. In one multiprocessor configuration, the main memory facilities of the individual systems are interconnected so that each processor can, in addition to its own memory facility, access the main memory facilities of the other systems. In such configuration, when the cache data of a processor is destaged, it is important to direct the cache data to the proper main memory facilities. Thus, there exists a need for a method and apparatus of destaging cache data in a system which has multiple main memory facilities, and specifically for a method of directing the cache data to a proper main memory facility during a destaging operation.

Furthermore, to ensure data integrity, there is a need for a method and apparatus to ensure proper destaging of the cache data even in the presence of an error in the identification of a source main memory facility in a destaging operation.

SUMMARY OF THE INVENTION

The above objects are satisfied in the cache memory system of the present invention in which a processor is connected to at least two main memory facilities. The processor has a cache memory for staging data from the main memory facilities. The cache memory has a tag area storing system addresses which identify the locations in the combined storage space of the main memory facilities of the cache data and a tag area storing indicators which identify the memory main facilities from which cache data are staged. During destaging operations, the indicators are used to direct the cache data to the proper main memory facilities. If there is an error in an indicator, the corresponding cache data will be destaged to each of the main memory facilities.

The system addresses of the destaged data are checked at each main memory facility to determine if the main memory facility is the source of the destaged data. If, in checking a system address destaged with a cache data entry, a main memory facility determines that it is the source of the destaged data entry, then it will store the destaged data. Otherwise, the destaged data will be discarded.

DESCRIPTION OF THE PREFERRED EMBODIMENT

Figure 1:
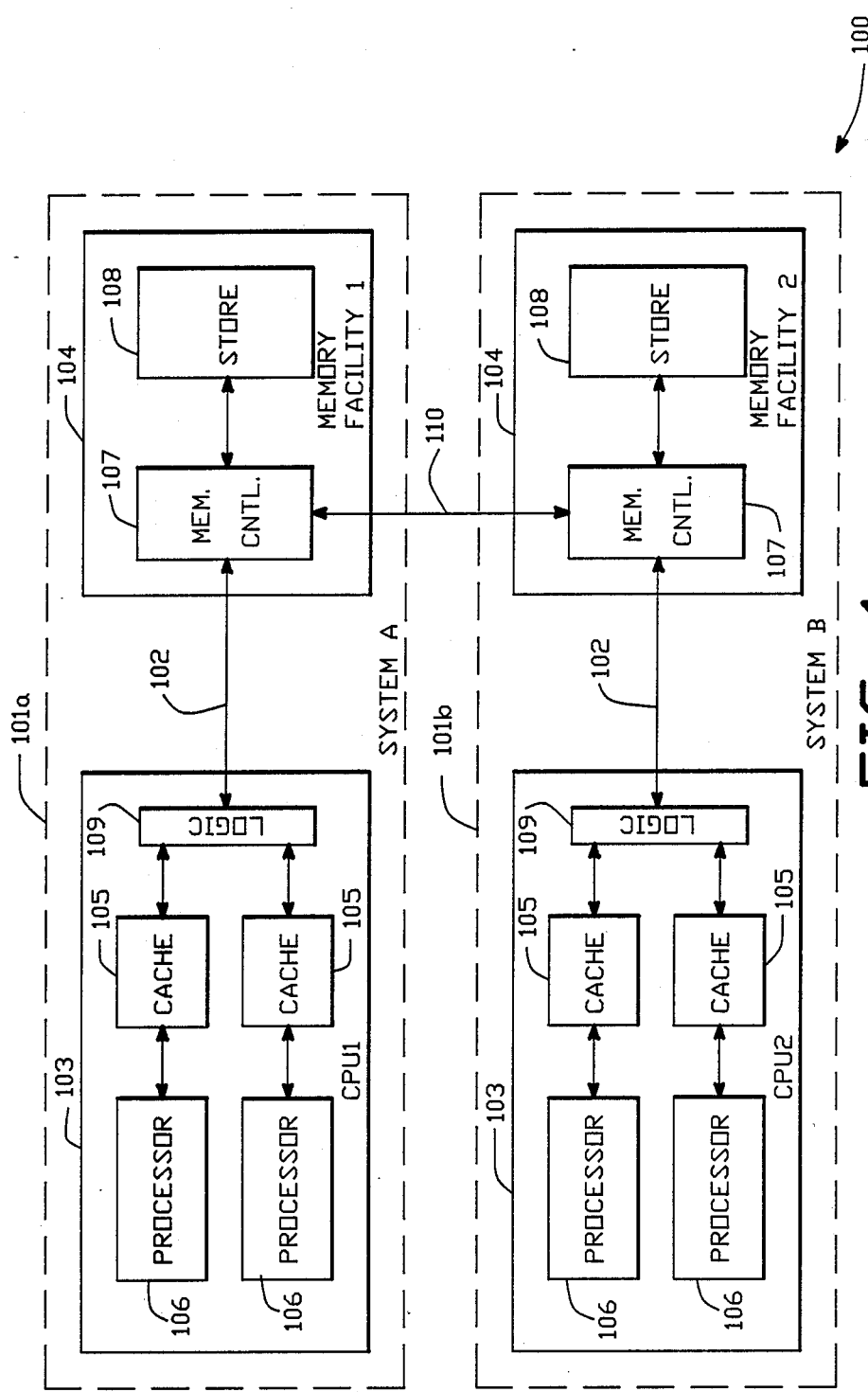
FIG. 1 is a block diagram of a multiprocessor system wherein the present invention is embodied.

FIG. 1 is a block diagram of a multiprocessor system 100 which comprises a system A 101$_a$ and a system B 101$_b$. Each system 101 has a central processing unit 103 and a local main memory facility 104. The central processing unit 103 and its local main memory facility 104 are coupled by an interface 102 which comprises control and data lines.

Each main memory facility 104 has a main memory 108 and a memory controller circuit 107 to control the operation of the main memory 108. Circuit 107 also provides an interface between the main memory 108 and the central processing unit 103.

The main memory facilities 104 of the multiprocessor system 100 are interconnected by data and control signal lines 110. Through such interconnection 110, each central processing unit 103 can access both its local main memory facility and the main memory facility of the other system (as a remote main memory facility). The combined memory space of the local and remote main memory facilities is addressed by each central processing unit 103 using a system address.

Figure 2:
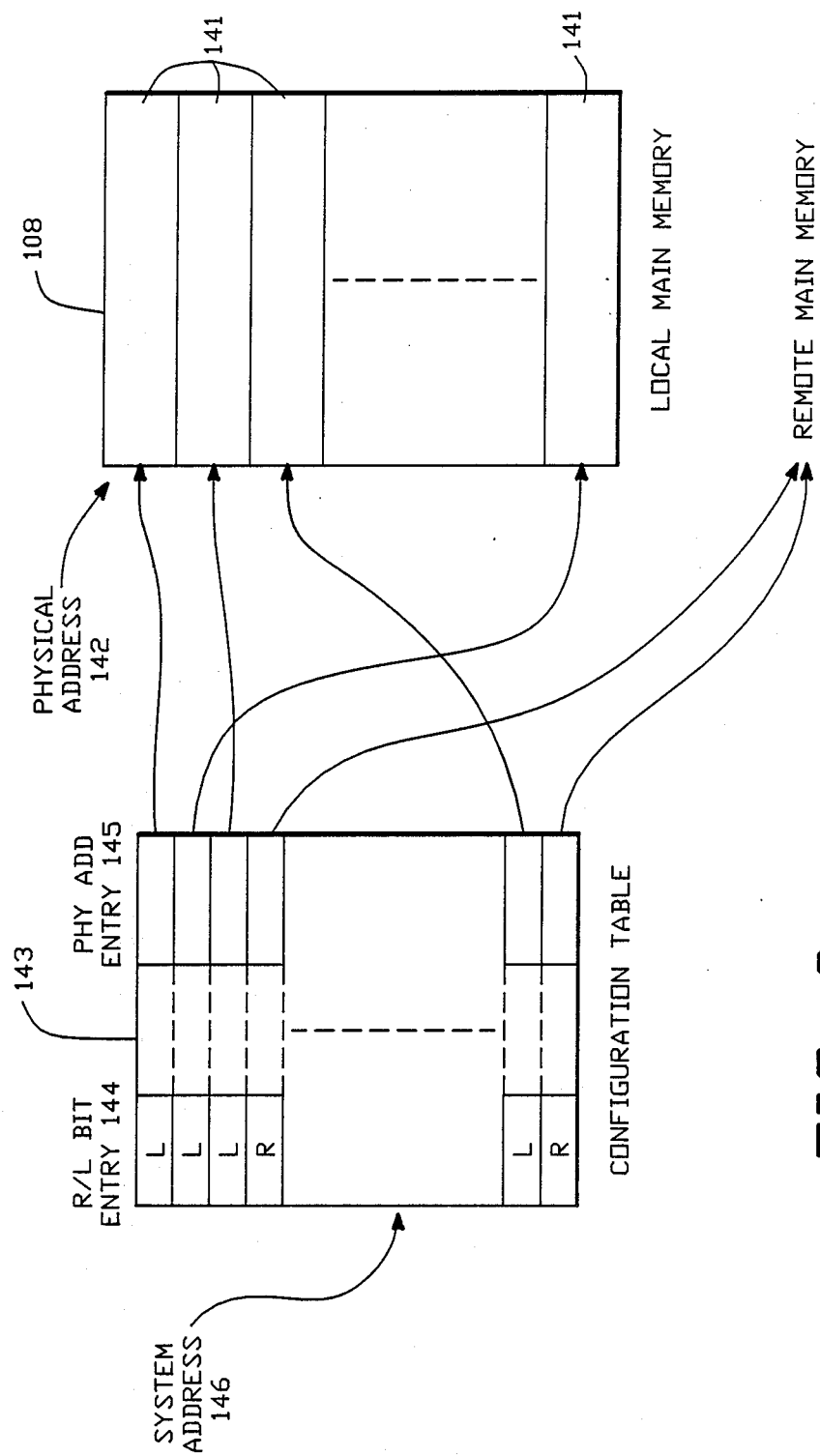
FIG. 2 shows the translation scheme in a main memory facility of the preferred embodiment.

Refer to FIG. 2, within each main memory facility 104 is a main memory 108 wherein data are stored. The storage space of each main memory 108 is partitioned into a plurality of memory blocks 141 with a predefined size. Thus, for example, if a main memory 108 has ten megabytes and if the size of each memory block is one megabyte, the main memory would have ten memory blocks. The memory blocks of a main memory 108 are addressed by a physical address 142.

Within each main memory facility 104 is a configuration table 143. Each entry of the configuration table 143 has a remote/local bit entry 144 and a physical address entry 145. The configuration table 143 is addressed by the system address 146. For a particular system address, the remote/local bit entry 144 in the configuration table 143 is used to indicate whether the storage space identified by the system address belongs to the main memory 108 of the local memory facility or to the main memory 108 of the remote memory facility. Furthermore, for a particular system address, the physical address entry 145 in the configuration table 143 gives an address to select a block in the main memory 108 that corresponds to the system address. Thus, the configuration table 143 of each memory facility 104 is used to translate a system address coming from the local central processing unit 103 into a address of the proper memory block within the proper local/remote main memory 108. Each central processing unit 103 comprises one or more processors 106. Each processor 106 has a similar structure as the AMDAHL System/5890. Briefly, each processor 106 is organized into an instruction unit, an execution unit, a storage unit and an external unit. The instruction unit controls the sequence of instructions flowing through the pipeline and prepares the instructions (for example, fetching the operands), so that they can be executed by the execution unit. The storage unit maintains a corresponding cache 105 for instructions and operands. It retrieves instructions and operands from either its cache memory 105 or from the main memory facilities 104, and stores results back to its cache memory 105. When a new line of data is needed in its cache memory 105 and if the cache memory is full, the storage unit is responsible for performing a move-out operation to destage a cache line to the proper main memory facility 104 and a move-in operation to stage the new line from the proper main memory facility 104.

Figure 3:
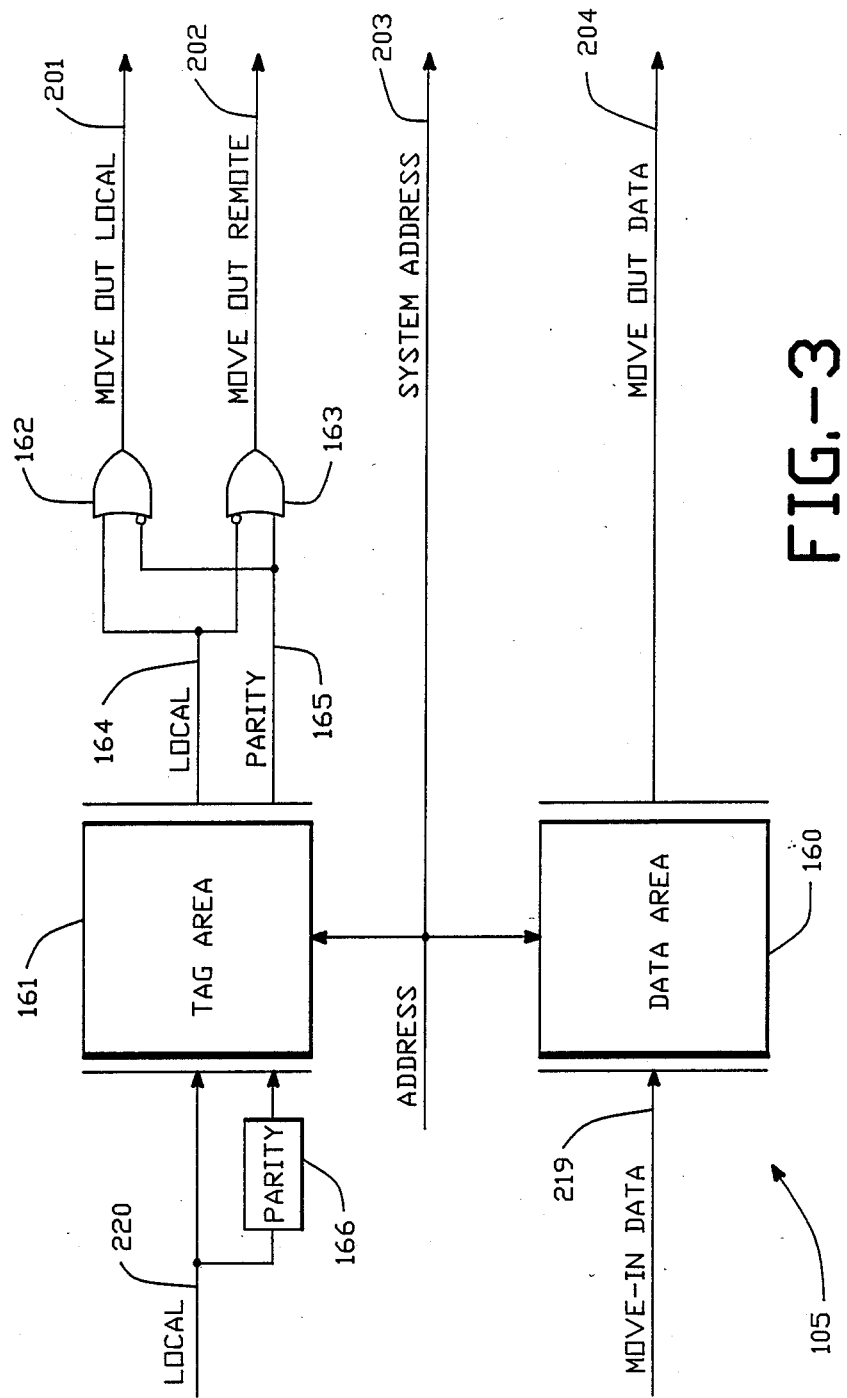
FIG. 3 is a block diagram showing how signals are generated to direct cache data to the proper memory facility.

Refer to FIG. 3, the cache memory 105 comprises a data area 160 and a tag area 161. The data area 160 stores data staged from both the local and remote memory facilities 104. The tag area contains a "modified" bit (not shown) which is set when the line is modified. A modified line of data will be destaged when the corresponding line is to be replaced by new data, or when another central processing unit 103 needs the line from the main memory facility 104.

The tag area 161 also contains entries, each of which includes a cache local/remote bit. The cache local/remote bit) is used to identify the main memory facility 104 from which the corresponding data line is staged. A corresponding parity bit is stored in the tag area 161 along with each cache local/remote bit entry. In the preferred embodiment, the output from an addressed cache local/remote bit entry will be a "1" if the corresponding data line belongs to the local main memory facility of the central processing unit and a "0" if the corresponding data line belongs to remote main memory facility.

The cache local/remote bit is used by a logic circuit 109 within each central processing unit 103 to direct the destaged data to the proper main memory facilities 104. Logic circuit 109 comprises two OR gates 162, 163. One input to the OR gate 162 is the output 164 of an addressed cache local/remote bit from the tag area 161. Another input to the OR gate 162 is the negative output of output 165 of the stored parity corresponding to output local/remote bit. One input to the OR gate 163 is the negative phase of the addressed local/remote bit 164. Another input to the OR gate 163 is the output 165 of the stored parity corresponding to the output cache local/remote bit.

If an addressed line from a cache belongs to the local main memory facility and if the parity is good, then only the output of OR gate 162, which gives a "move-out local" signal 201, will be active. If an addressed line from a cache belongs to the remote main memory facility and if the parity is good, then only the output of OR gate 163, which gives a "move-out remote" signal 202, will be active. On the other hand, if the parity is bad in both cases, then both the move-out local signal 201 and the move-out remote signal 202 will be active. According to the preferred embodiment, on a move-out operation, the system address signals 203 and one or both of the move-out local signal 201 and move-out remote signals will accompany the move-out data signals 204 to the local main memory facility.

Figure 4:
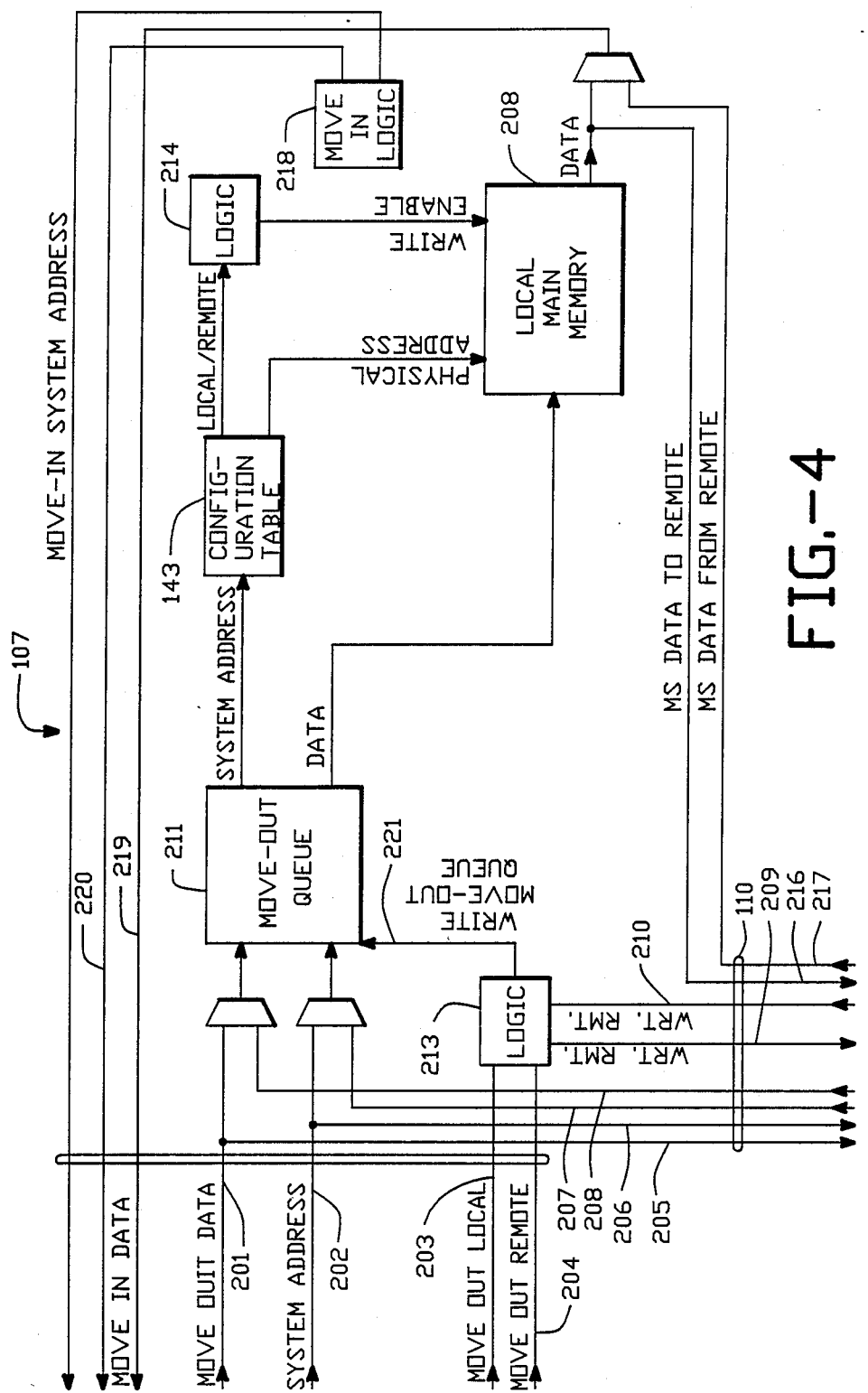
FIG. 4 is a block diagram of the main memory facility of the FIG. 1 multiprocessor system.

A block diagram of a main memory facility 104 is shown in FIG. 4. The interface 102 between a main memory facility 104 and its central processing unit 103 includes a set of "move-out data" lines 201 which carry move-out data signals from the central processing unit 103 to its local memory facility 104 and a set of "system address" lines 202 which carry system address signals for both move-out operations and move-in operations. The interface 102 also includes the "moveout local" line 203 and the "move-out remote" line 204 from the local central processing unit 103. Not shown in FIG. 4 are signals are a plurality of request/response signals which are included as part of the interface 102 between a main memory facility 104 and its central processing unit 103. These include signals sent by the main memory facility 104 to request; a move-in operation from a memory facility, or a move-out operation.

Upon entering each main memory facility 104 the move-out data lines 201 and the system address lines 202 will go to the other memory facility 104 through data lines 205 and address lines 206 of the interconnection 110. Thus, besides receiving move-out data signals 201 and system address signals 202 from the local central processing unit 103, each main memory facility 104 also receives move out data signals 207 and system address signals 208 from the other main memory facility 104 through the interconnection 110.

When a main memory facility 104 receives a move-out remote signal on line 204, a write remote signal will be sent by circuit 213 on line 209 to the remote main memory facility 104. Conversely, when the remote main memory facility receives a move-out remote signal, its circuit 213 will send a write remote signal 210 to the local memory facility 104.

Also included in the interconnection 110 but not shown in FIG. 4. are request/response signals from one main memory facility 104 to the other main memory facility 104. These include signals requesting data from the other main memory facility. A main memory facility 104 request data from the other main memory facility in response to a request from its local central processing unit 103 to perform a move-in operation for data that belongs to the remote main memory facility 104. As a result of the request, data from the remote memory main facility 104 is moved into the local main memory facility through lines 217 of the interconnection 110 and then to the central processing unit. Conversely, data will be moved from the local main memory facility to the remote main memory facility through lines 216 in response to a request from the remote main memory facility 104 for data stored in the local main memory facility.

To improve performance of the central processing units 103, move-in operations are performed with a higher priority than move-out operations. Performance is improved by this priority scheme because data which require a move-in operation can be accessed without being delayed by data move-out operations.

Because move-in operations are performed with a higher priority than move-out operations, a move-out queue 211 is provided in each main memory facility 104 to temporarily store data and system addresses of moveout operations. Storing of system address and data signals into the move-out queue 211 is controlled by a "write move-out queue" signal 221 generated by a circuit 213. The circuitry 213 generates the write move-out queue signal 221 if either the move-out local line 203 from its central processing unit 103, or the write remote line 210 from the remote main memory facility 104 is active.

Each main memory facility 104 has a move-in logic circuit 218 which controls move-in operations of data from the main memory 108 to the cache memories 105. If the data in a move-in operation is from the local main memory facility, then the move-in logic circuit 218 sends a "local" signal on line 220 along with the move-in data to the local central processing unit 103. If the data is from the remote main memory facility 104, the "local" signal will not be activated.

Referring back to FIG. 3, when a signal is received by a central processing unit 103 on line 220, a parity generator 166 in the central processing unit 103 will generate a parity of the signal. The signal, along with the parity will be stored into a memory tag area 161 location which corresponds to the cache location in which the staged data is stored.

When space is required in a cache memory 105 to hold data from a main memory facility 104, the corresponding storage unit will select (using, for example, the least recently used algorithm) a line in the cache memory to hold the new data. If the selected line is modified (that is, if the "modified" bit is active), a move-out operation is performed to destage the cache data back to the proper main memory facility 104.

On a standard move-out operation, the corresponding entry in the tag area 161 will be retrieved. The cache local/remote bit in the tag area 161 is used to generate signals on the move-out local line 201 and the move-out remote line 202 as previously described. As described, these lines 201, 202 are used to direct the cache data and system address signals to the proper main memory facility. If the parity of a cache local/remote bit is good, then only one of the two lines 201, 202 will be activated. Otherwise, both lines 201, 202 will be activated so that the cache data and the system address will be written to the move-out queues 211 of both main memory facilities 104.

Data and address signals stored in the move-out queue 211 are processed on a first-in-first-out basis. In processing an entry from the move-out queue 211, the system address portion of the entry is used to selected an entry from the configuration table 143. As previously discussed, from the selected entry of the configuration table 143, a local/remote bit and a physical address will be generated. The local/remote bit from the configuration table 143 is received by a circuit 214. If the local/remote bit from the configuration table 143 indicates that the data belongs to the local memory facility, then a write enable signal 215 will be generated by circuit 214 to write and the data into the local main memory 108. The location is identified by the physical address from the configuration table 143. If the local/remote bit from the configuration table indicates that the data belong to the remote memory facility, then the write enable signal is not generated and the data is discarded. But the data would have been sent to the other main memory facility during the cache move-out as both the move-out local and the move-out remote signals are generated.

The foregoing description of the preferred embodiment of the present invention has been presented for the purpose of illustration only. It is not intended to be exhaustive or to limit the invention to the precise form disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with various modifications as such suit to the particular use contemplated. It is intended that the scope of the invention be defined by the accompanying claims and its equivalents.

We claim:

1. A data processing system, comprising:
   at least a first memory facility and a second memory facility;
   a processor connected to the memory facilities addressing data in the first memory facility and the second memory facility by a system address, wherein the processor includes:
   a cache for storing data staged from the memory facilities, including means for storing the system addresses of the data staged and means for storing indicators which identify the memory facilities from which the data is staged;
   means coupled to the cache for detecting errors in an indicator during a destaging operation;
   means coupled to the cache for destaging data and addresses to a memory facility identified by the corresponding indicator if no error in the indicator is detected;
   means coupled to the cache for destaging data and the corresponding system address to each of the memory facilities if an error is detected in a corresponding indicator; and the each of said memory facilities includes:
   means for receiving the system addresses and data destaged from the processor, including means for checking system addresses destaged from the processor to determine to which memory facility the corresponding destaged data belongs.

2. A system as in claim 1, wherein said receiving means in the memory facilities includes means for queuing destaged system addresses and data.

3. A system as in claim 1, wherein said indicator comprises a local/remote bit.

4. A system as in claim 3, including means for generating a first signal if the local/remote bit is at a first state and a second signal if the local/remote bit is at a second state.

5. A system as in claim 4, wherein said detecting means includes means for checking parity of the local/remote bit.

6. A system as in claim 5, wherein said generating means generates both the first and second signal if a parity error is detected by the parity checking means.

7. A system as in claim 1, wherein the address checking means includes a configuration table in a memory facility storing an identification of which memory facility corresponds to each system address.

8. A system as in claim 7, wherein a first memory facility discards destaged data if the identification in the configuration table corresponding to the destaged system address identifies a second memory facility.

9. A multiprocessor system, comprising:

a first subsystem having a first processor connected to a first main memory facility;

a second subsystem having a second processor connected to a second main memory facility;

wherein the first main memory facility is connected to the second main memory facility;

each of the first and second processors locating data in both the first and second main memory facilities by a system address, each processor having:

a cache for storing data staged from the memory facilities, including means for storing system addresses of the staged data and means for storing indicators which identify the main memory facilities from which the data is staged;

means responsive to said indicators for generating a first signal and a second signal to the corresponding memory facility;

means coupled to the cache for detecting errors in an indicator during a destaging operation, including means for generating both the first and second signals if an error is detected; and means for destaging cache data and system addresses to the corresponding memory facility;

each of the first and second memory facilities having:

means for receiving the first and second signal from the corresponding processor, including means for transmitting a received second signal to the other memory facility;

means for receiving addresses and data destaged from the corresponding processor concurrently with the first and second signal, including means for storing the data if the first signal is received and transmitting the data to the other memory facility if the second signal is received;

means for receiving a second signal, addresses and data from the other memory facility, including means for storing the data if a second signal is received from the other memory facility.

10. A multiprocessor system as in claim 9, wherein said receiving means in each memory facility includes means for queuing the destaged address and data.

11. A multiprocessor system as in claim 9, wherein said indicator comprises a local/remote bit.

12. A multiprocessor system as in claim 11, wherein said errors are detected by means for checking parity of the local/remote bit.

13. A multiprocessor system as in claim 12, wherein said generating means generates both the first and second signal if a parity error is detected by the checking means.

14. A multiprocessor system as in claim 9, wherein each of the first and second main memory facilities includes:

means, receiving the system addresses of destaged data, for checking the system addresses to determine to which of the first and second main memory facilities the corresponding destaged data belongs.

15. A multiprocessor system as in claim 14, wherein the address checking means includes a configuration table in each memory facility storing information identifying to which memory facility each system address belongs.

16. A multiprocessor system as in claim 15, wherein a main memory facility discards destaged data if the corresponding system address identifies a remote main memory facility.

* * * * *